W. T. REID.
ENGINE FOR AIRCRAFT.
APPLICATION FILED AUG. 8, 1918.
1,318,410.
Patented Oct. 14, 1919.
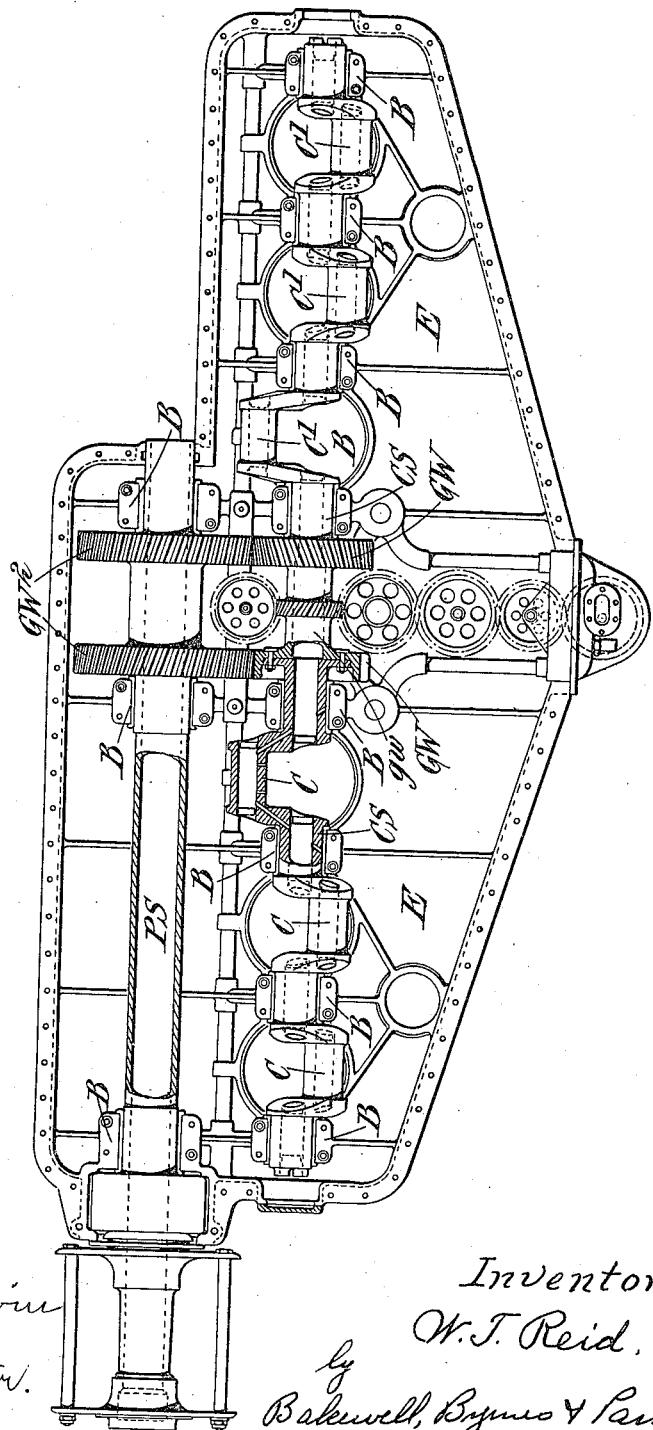

UNITED STATES PATENT OFFICE.

WILFRID THOMAS REID, OF BRISTOL, ENGLAND, ASSIGNOR TO THE BRITISH & COLONIAL AEROPLANE COMPANY LIMITED, OF BRISTOL, ENGLAND.

ENGINE FOR AIRCRAFT.

1,318,410.

Specification of Letters Patent. Patented Oct. 14, 1919.

Application filed August 8, 1918. Serial No. 249,023.

*To all whom it may concern:*

Be it known that I, WILFRID THOMAS REID, a subject of the King of England, residing at Bristol, England, have invented certain new and useful Improvements in Engines for Aircraft, of which the following is a specification.

An aircraft engine frequently has upon the crank-shaft a number of cranks, for example six cranks in a row in an engine with six fixed cylinders; to the end of this long crank-shaft there is usually united, co-axially, the propeller-shaft or main driven shaft, which likewise has to be a long one because of the need that it should be supported in widely-separated bearings in order that in the turning of the aircraft in its course the shaft rotating, as it does, at a high speed, shall not give trouble by its gyroscopic action. These two long principal shafts in line make the overall length of the engine and driven shaft much too great for compactness of construction and necessitate the use of a heavy crank-shaft since the total torque of all the cranks must all pass out by way of one end of it. It is the object of the present invention to enable in the manner hereinafter described a convenient, compact and rigid construction to be obtained and a lighter crank-shaft to be safely employed while at the same time the main driven- or propeller-shaft may have widely-separated bearings as before. Accordingly the present invention comprises the combination of an engine having a crank-shaft contained within the casing of said engine as to its cranks and upon which crank-shaft there is a gear-wheel between the cranks of that engine which is fixed to the crank-shaft so as to be integral with it to receive the torque from the cranks on each side of it (so that the total torque is divided between the portions of the crank-shaft on each side of it), with a propeller-shaft or other main driven-shaft parallel or approximately so to the crank-shaft and placed alongside it in bearings borne by the aforesaid casing. On the propeller-shaft or main driven shaft is a gear-wheel fixed to the said main driven-shaft so as to be integral therewith, and geared directly into the companion gear-wheel on the crank-shaft. Each of the gear-wheels is co-axial with the shaft on which it is fixed.

The widely-separated bearings for the second shaft (*i. e.* the propeller- or main driven-shaft) are in the engine crank-case which insures maintenance of those bearings in the desired rigid relationship to the bearings of the crank-shaft and also insures ample lubrication for the said second shaft.

The accompanying drawing illustrates in longitudinal central section a combination according to the present invention. In it the engine E has a crank-shaft CS, upon which crank-shaft or on a continuation thereof from one set of cranks to the other in the same engine is a twin gear-wheel GW fixed to the shaft co-axially with it, between the set of cranks C C C and the set of cranks $C^1$ $C^1$ $C^1$. The boss $gw$ of the twin gear-wheel GW may constitute the continuation aforesaid. This twin gear-wheel receives the torque from the sets of cranks on each side of it. PS is the propeller-shaft or other main driven shaft parallel, or approximately so, to the crank-shaft CS and placed alongside it, both the propeller-shaft and the crank-shaft turning in bearings B in the casing of the engine E. On the propeller-shaft PS is fixed so as to be co-axial and virtually integral therewith a twin gear-wheel $GW^2$ geared directly into the companion gear-wheel GW on the crank-shaft. The widely-separated bearings B for the propeller-shaft or main driven shaft are secured in the engine casing for the reasons hereinbefore stated.

I am aware that it has been proposed (take for instance the expired British Letters Patent granted to King No. 27031/04 and also British Letters Patent granted to Boothroyd and others No. 103444) to gear the crank-shaft of an internal-combustion engine with a main driven shaft parallel to it, and I make no claim to such a construction broadly.

What I claim as my invention and desire to secure by Letters Patent is:—

1. In an internal combustion engine, the combination with a casing of a crank shaft having two sets of cranks journaled in said casing, a twin gear wheel fixed co-axially on the crank shaft between said sets of cranks, widely separated bearings in said casing, a main driven shaft parallel to the crank shaft and journaled in said bearings, and a twin gear wheel fixed co-axially on said main driven shaft and arranged to mesh directly with the first mentioned twin gear wheel on the crank shaft, substantially as described.

2. In an internal combustion engine, the combination with a casing of a crank shaft having two sets of cranks journaled in said casing, a twin gear wheel fixed co-axially on the crank shaft between said sets of cranks, widely separated bearings in said casing, a main driven shaft parallel to the crank shaft and journaled in said bearings, and a twin gear wheel fixed co-axially on said main driven shaft and arranged to mesh directly with the first mentioned twin gear wheel on the crank shaft, one of said bearings being seated adjacent to the gear wheel on the driven shaft and the other of said bearings being situated at the end of the casing remote from the gear wheels, for the purpose specified.

3. In an internal combustion engine, the combination with a casing, of a crank shaft having two sets of cranks journaled in the casing, a gear wheel fixed co-axially on the crank shaft between said sets of cranks, widely separated bearings in said casing, a main driven shaft parallel to the crank shaft and journaled in said bearings, and a gear wheel fixed co-axially on the said driven shaft and arranged to be driven from the gear wheel on the crank shaft, substantially as described.

In testimony whereof I have signed my name to this specification in the presence of two subscribing witnesses.

WILFRID THOMAS REID.

Witnesses:
ALAN E. LONG,
E. TYLER.

Copies of this patent may be obtained for five cents each, by addressing the "Commissioner of Patents, Washington, D. C."